United States Patent [19] [15] 3,653,588
Dreibelbis [45] Apr. 4, 1972

[54] AIR DISTRIBUTION UNIT

[72] Inventor: Richard C. Dreibelbis, Fair Lawn, N.J.

[73] Assignee: Carrier Corporation, Syracuse, N.Y.

[22] Filed: May 1, 1970

[21] Appl. No.: 33,573

[52] U.S. Cl. ....................236/49, 137/513.7, 236/80
[51] Int. Cl. ..................................G05b 11/44, F24f 11/04
[58] Field of Search ............236/80, 85, 49; 137/488, 513.7, 137/513.3, 513.5; 251/25

[56] References Cited

UNITED STATES PATENTS

| 3,434,409 | 3/1969 | Fragnito | 236/49 X |
| 3,225,788 | 12/1965 | Church et al. | 137/513.7 |
| 2,816,572 | 12/1957 | Pratt | 137/513.3 X |

Primary Examiner—William E. Wayner
Attorney—Harry G. Martin, Jr. and J. Raymond Curtin

[57] ABSTRACT

An air distribution unit for discharging conditioned air into an area to be treated, including a variable volume control chamber regulating the volume of conditioned air supplied to the area. A control valve is operable to regulate the variable volume control chamber to maintain a substantially constant discharge of conditioned air into the area, irrespective of changes in supply air pressure. The control valve includes a first orifice for passage of a minimum quantity of control air through said valve to the control chamber. A bleed thermostat associated with the control valve regulated the quantity of control air supplied to the variable volume control chamber through the valve in response to area temperature.

7 Claims, 4 Drawing Figures

Patented April 4, 1972 3,653,588
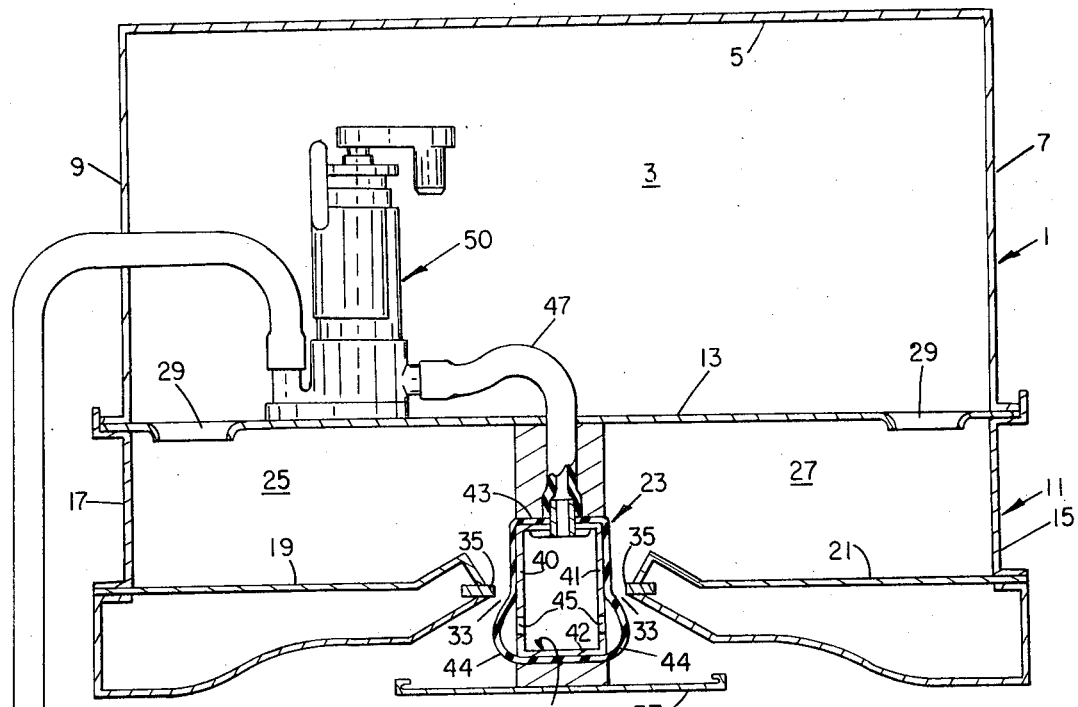
FIG. 1
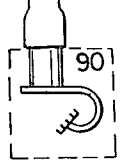
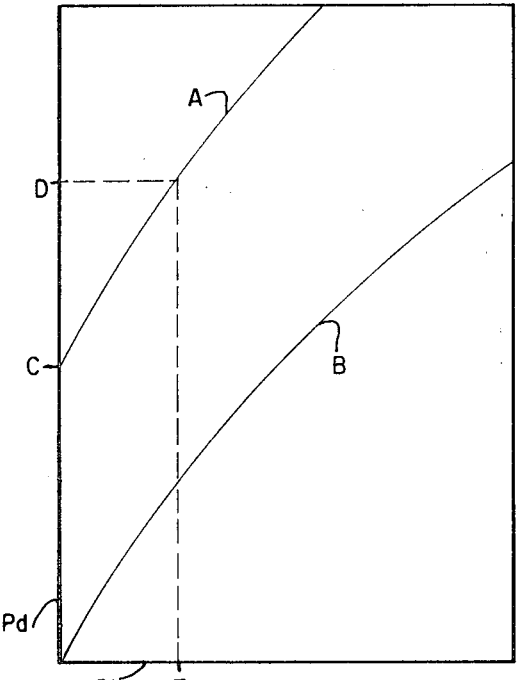
FIG. 4
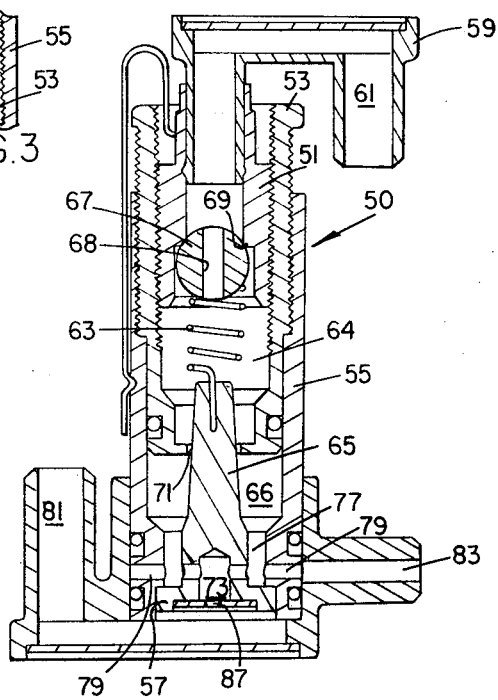
FIG. 2
FIG. 3
INVENTOR.
RICHARD C. DREIBELBIS
BY Raymond Curtin
ATTORNEY.

AIR DISTRIBUTION UNIT

BACKGROUND OF THE INVENTION

This invention relates to an air distribution unit employed in an air conditioning system, and more particularly, to a control employed therewith, operable to maintain a substantially constant quantity of air flow therethrough.

In U.S. Letters Pat. No. 3,167,253, there is disclosed an air distribution unit to provide a relatively constant supply of conditioned air to a room or area of a building. The air distribution unit disclosed therein has a pressure responsive mechanism for maintaining a substantially constant quantity of air flow through said unit, regardless of supply duct pressure, while allowing a slight variation in air quantity in response to room temperature variations as sensed by a bleed type thermostat.

Such a pressure responsive mechanism is illustrated by U.S. Letters Pat. No. 3,434,409. Designers of air conditioning systems employing air distribution units of the type disclosed in U.S. Pat No. 3,167,253 try to limit installation and operating costs by maintaining conditioned air supply duct pressures as low as possible and yet have the minimum pressure required for the quantity of conditioned air desired.

Pressure responsive mechanisms of the type illustrated in U.S. Pat. No. 3,434,409 have proven to be an efficient and relatively inexpensive device for maintaining substantially constant supply of conditioned air.

The object of this invention is to provide an improved pressure responsive mechanism.

SUMMARY OF THE INVENTION

This invention relates to an air distribution unit employed in an air conditioning system, and more particularly, to a control valve employed therewith, operable to maintain a substantially constant quantity of air flow therethrough.

The control valve includes a housing defining first and second chambers, the first chamber communicating with a supply air duct associated with the network of ducts distributing treated air from the central station refrigeration machinery, and the second chamber communicating with a variable volume control chamber. Means define a first passage communicating the first chamber of the control valve with the supply duct for continuous passage of control air from the duct to the first chamber, irrespective of duct air pressure. Pressure responsive means associated with the first means maintains the flow of air through the control chamber from the duct at a minimum quantity when the pressure in the duct chamber is below a desired minimum. A variable orifice communicates the first and second chambers of the control valve. A fixed orifice, disposed in the second chamber, is operable to exhaust control air therefrom in response to a bleed thermostat connected thereto.

Under normal operating conditions, the discharge of treated air from the air distribution unit is maintained at a substantially constant quantity. The pressure of the control air supplied to the variable volume control chamber regulating passage of air from the air distribution unit is of a magnitude directly related to the pressure of the air in the supply duct.

When the bleed thermostat senses the area being served by the air distribution unit no longer requires conditioned air, the thermostat closes off an exhaust port of the control valve, thereby directing the control air through the control valve to the variable volume control chamber. However, if the pressure in the supply duct is at a minimum, the pressure responsive means in the housing will operate to prevent flow of control air through the valve to the variable volume control chamber. The passage means for maintaining a continuous flow of control air from the supply duct through the control valve, operates to maintain regulation of the variable volume control chamber to minimize overcooling.

BRIEF DESCRIPTION OF THE DRAWINGS

FIG. 1 of the drawings is a sectional view of an air distribution unit illustrating a variable volume damper and a control mechanism therefor in accordance with the present invention;

FIG. 2 of the drawings is a sectional view of the control mechanism employed in the air distribution unit of FIG. 1;

FIG. 3 is a fragmentary view of a portion of the control mechanism illustrated in FIG. 2, showing an alternative construction therefor; and FIG. 4 graphically illustrates the operation of the control mechanism of FIGS. 2 and 3.

DESCRIPTION OF THE PREFERRED EMBODIMENT

Referring to the drawings, there is shown an air distribution unit and a control mechanism therefor in accordance with the present invention.

Referring in particular to FIG. 1, there is shown an air distribution unit 1 including a duct section 3 having a top wall 5 and side walls 7 and 9. The air distribution section 11, which is separated from duct section 3 by partition 13, is defined by side walls 15 and 17 and bottom sections 19 and 21. Air distributing section 11 is divided by a variable volume control chamber 23 into plenums 25 and 27. Openings 29 in partition 13 provide passageways fro conditioned air between duct section 3 and plenums 25 and 27.

Air is discharged from plenums 25 and 27 into the area to be conditioned through slots 33 formed between edges 35 of bottom sections 19, 21 and variable volume control chamber 23. A deflector 37 is mounted on the bottom portion of control chamber 23 to deflect the air discharged from slots 33 in a generally horizontal direction.

Control chamber 23 includes a support member 39 defined by walls 40, 41, 42 and 43. The walls are covered with a suitable fabric envelope 44 which forms the bladder portion of the control chamber 23. The fabric may consist of a cloth impregnated with a suitable elastomer material, such as a nylon fabric coated or impregnated with neophrene or a polymerized butadiene.

Openings 45 are provided in walls 40 and 41 for passage of control air into the bladder, control air being provided to control chamber 23 through line 47. As will be explained hereinafter, control air pressure is normally lower than the pressure existing in plenums 25 and 27. Because of this, the upper portion of the bladder will be maintained in substantial surface contact with the walls 40 and 41. However, as the air passes through slots 33 it is expanded, thereby decreasing its pressure. The lower portion of the bladder damper will be at a higher pressure than the adjacent air, causing the lower portion of the bladder to inflate, the degree of inflation determining the width of slot 33 and therefore the quantity of air discharged therethrough.

The control valve 50 employed with the air distributing unit has a top section 51, an upper cylindrical section 53, a lower cylindrical section 55, and a bottom section 57. Threads are provided on sections 51, 53 and 55 to allow adjustment of the relative positions therebetween for reasons to be hereinafter explained. A cap 59 having a passageway 61 therethrough for passage of air from duct section 3 to the interior of control valve 50, is provided for attachment to top section 51. A spring 63 affixed to tapered post 65 of bottom section 57 is provided for biasing a relief ball 67 against seat 69 formed in top section 51. Spring 63 is disposed in a first chamber 64 of the valve. Relief ball 67 has an orifice 68 included therethrough for a reason to be more fully explained hereinafter. Upper cylindrical section 53 is provided with an orifice 71 which, in conjunction with tapered post 65, regulates flow of control air therethrough. Post 65 is disposed in a second chamber 66 of the valve. Vertical passageway 73 and horizontal passageways 79 are provided in bottom section 57 for passage of control air into ducts 81 and 83. An orifice 87 between vertical passageway 77 and duct 81 is provided for restricting flow of bleed air from control 50. Air from duct 83 is provided to variable volume control chamber 23 through line 47.

As can be seen by reference to FIG. 2, spring pressure on relief ball 67 may be adjusted by altering the relative positions of bottom section 57 and top section 51. Air flow through orifice 71 may be regulated by altering the relative positions of upper cylindrical section 53 and bottom section 57.

Referring to FIG. 3 there is shown an alternative construction for ball valve 67 and seat 69 formed in top section 51. In lieu of the orifice formed in ball valve 67, seat 69 is formed so ball valve 67 can never fully close off flow of control air from passage 61 to the downstream side of ball valve 67 and thus to control chamber 23. Seat 69 includes abutment means 70 to maintain the desired passage about ball valve 67.

As will be more fully explained hereinafter, control valve 50 is designed to maintain a relatively constant air flow through the air distribution unit. However, to obtain a more fully regulated room temperature, it may be necessary to vary the flow of conditioned air from the distribution unit in response to a change in heating or cooling load encountered in the area or room served by the unit. To provide such temperature responsive regulation, air from duct 81 is supplied to a bleed type thermostat as illustrated in FIG. 1 by thermostat 90. As will be apparent hereinafter, the thermostat operates to vary the air bled through orifice 87 and thus varies the pressure supplied to the control chamber, in turn causing the quantity of air discharged from the unit to range slightly below the set quantity.

Referring now to FIG. 4, the manner in which the control valve operates to maintain a substantially constant discharge of air from the distributing unit, irrespective of variations in supply duct pressure, will be explained. Valve 50 is a device that when calibrated, produces an intermediate pressure in duct 83 which is proportional in magnitude to pressure in duct 3. The variation of pressure in chamber 83 results in a variation of the magnitude of pressure in chamber 23. Thus, by regulating the control signal to chamber 23 in direct proportion to variations in duct pressure, valve 50 operates to maintain a substantially constant air discharge. The changes in control pressure operating in control chamber 23 will provide a slot width necessary to produce the desired constant discharge of air, irrespecitve of the pressure of the air supplied to the unit. In particular, curve A of FIG. 4 represents the operating characteristic of the air distribution unit wherein a specific quantity of conditioned air is to be discharged, irrespective of changes in supply duct pressure. In particular, the axis labeled P$d$ represents the pressure in the duct, and similarly, the axis labeled P$b$ represents the pressure in the control chamber. Thus, as the pressure in the duct increases, the pressure in the control chamber simultaneously increases.

The curve of FIG. 4 labeled B represents the pressure relationship between duct pressure and control chamber pressure necessary to substantially shut off the operation of the air distribution unit when conditioned air is no longer required, shutoff being obtained in response to the bleed thermostat associated with the unit.

Spring 63 exerts a force on ball 67 that maintains the ball on seat 69 until a minimum duct pressure exists, this duct pressure being the minimum pressure operable to provide the desired air flow of conditioned air from the unit. The minimum duct pressure for the air flow, represented by curve A, is point C. As duct pressure increases, ball 67 will unseat to pass control air through valve 50 to control chamber 23. The magnitude of the control signal will be directly related to the air duct pressure. Thus, if supply air pressure were to increase to point D of FIG. 4, the control chamber pressure will increase accordingly to point E.

As noted hereinbefore, designers of air conditioning systems employing air distribution units of the type herein discussed try to maintain the supply duct air pressure at about the minimum necessary for the particular quantity of conditioned air to be supplied to the areas to reduce operating and installation costs. However, such minimum duct pressures have sometimes resulted in air distribution units overcooling the areas associated therewith. In particular, when bleed thermostat 90 senses that the room no longer requires cooling, the thermostat operates to shut off the bleed port therein and thus deliver substantially all the control pressure flowing through valve 50 to control chamber 23. However, when the bleed port of thermostat 90 closes, it produces a force acting in conjunction with the force produced by spring 63 operating on the "downstream" side of ball 67, which tends to seat the ball upon seat 69, thus closing off flow of control air through passage 61. If the duct pressure is at a minimum, the force provided by the supply air operating on the "upstream" side of ball 67 is insufficient to overcome the "downstream" force. Thus, control air will not pass through valve 50 to control chamber 23 and overcooling may result.

By providing orifice 68 in ball 67 as shown in FIG. 2, or by constructing seat 69 in the manner shown in FIG. 3, a continuous communication between duct section 3 and the control chamber may be maintained. So long as bleed thermostat 90 senses that room temperature conditions no longer require conditioned air, the bleed port of the thermostat remains closed and control chamber 23 is communicated with duct section 3 via valve 50, enabling the pressure in the chamber to increase, whereby the pressure in the control chamber operates to substantially decrease all flow of conditioned air through the distribution unit to the area being served thereby.

The improved pressure regulator shown herein operates to minimize overcooling when minimum supply duct pressures are employed.

While I have described and illustrated a preferred embodiment of my invention, it should not be limited thereto but may otherwise embodied within the scope of the following claims.

I claim

1. In combination with an air distribution unit for discharging air into an area to be treated including a duct section, said duct section being adapted to be placed in communication with the source of air at a desired pressure, means defining an outlet from said duct section into the area to be treated, and a variable volume control chamber for regulating the volume of conditioned air supplied to the area to be treated through the outlet, a control valve comprising:
   A. a housing defining a first chamber and a second chamber, a passage communicating the first chamber with the duct section, and a second passage communicating the second chamber with the variable volume control chamber;
   B. first means providing continuous communication between said duct section and said first chamber for passage of control air;
   C. pressure responsive means associated with said first means operable to prevent flow of air through the first passage while permitting the first means to provide continuous communication with, and flow of air into said first chamber at a minimum amount when the pressure in the duct section is below a desired minimum pressure;
   D. first restriction means disposed between the first and second chambers for communicating said chambers;
   E. fixed restriction means disposed in said second chamber for exhausting control air therefrom;
   F. a bleed thermostat communicating with said fixed restriction means regulating the exhausting of control air from said second chamber; and
   G. a control air pressure duct disposed between said first and fixed restriction means to communicate the pressure in the second chamber to the variable volume control chamber to regulate discharge of air from the air distribution unit.

2. An air distributing unit according to claim 1 wherein said first means includes a ball having a passage extending therethrough.

3. An air distributing unit according to claim 1 wherein said first means includes a seat having an abutment extending therefrom and a ball, said abutment contacting said ball to maintain continuous flow of air into said first chamber.

4. A control valve for use in an air distributing unit including a control chamber comprising:
  A. a housing having a first chamber and a second chamber therein, a first passage in said housing adapted to communicate the first chamber with a source of control air, a second passage adapted to communicate the second chamber with the place of use of control air;
  B. first means operable to provide a continuous flow of control air into said first chamber;
  C. pressure responsive means associated with said first means operable to prevent any flow of air into said first chamber through the first passage while permitting the first means to provide flow of control air to the first chamber when said air is below a desired minimum pressure;
  D. first restriction means disposed between the first and second chambers;
  E. fixed restriction means disposed in said second chamber for exhausting control air therefrom;
  F. a bleed thermostat communicating with said fixed restriction means to regulate the exhausting of control air from said second chamber; and
  G. a control air pressure duct disposed between said first and fixed restriction means to communicate the pressure in the second chamber to the air distribution unit.

5. A control valve according to claim 4 wherein said first means includes a ball having a passage extending therethrough.

6. A control valve according to claim 4 wherein said first means includes a seat having abutment means associated therewith and a ball, said abutment means engaging said ball so as to maintain a continuous flow of control air into said first chamber.

7. A method of operating an air distribution unit for discharging air into an area to be treated, including a duct adapted to be placed in communication with the source of air; a variable volume control chamber for regulating the volume of conditioned air supplied to the area to be treated; and a control valve for regulating the operation of the variable volume control chamber, comprising the steps of:
  A. discharging air from the duct to the area being treated through an opening controlled by the variable volume control chamber;
  B. passing a portion of the air from the duct through a control valve having a variable outlet and a section in communications with the control chamber whereby the operation of the control chamber is responsive to the pressure of air present in the control valve;
  C. modulating the discharge from the control valve outlet in response to the temperature of the air circulating within the area being treated to vary the pressure of the air in the valve and on cocurrently vary the pressure operating on control chamber; and
  D. maintaining communication between said duct and said variable volume control chamber to provide a predetermined pressure level in the variable volume control chamber independently of the discharge of air from said valve.

* * * * *